June 10, 1924.

V. H. GODILLON

DEVIATOR FOR RANGE FINDERS

Filed June 13, 1922

1,497,235

Inventor
Victor Honore Godillon

By
Maurs, Cameron, Lewis & Kerkam
Attorneys

Patented June 10, 1924.

1,497,235

UNITED STATES PATENT OFFICE.

VICTOR HONORÉ GODILLON, OF PARIS, FRANCE, ASSIGNOR TO SOCIETE D'OPTIQUE ET DE MECANIQUE DE HAUTE PRECISION, OF PARIS, FRANCE, A JOINT-STOCK COMPANY OF FRANCE.

DEVIATOR FOR RANGE FINDERS.

Application filed June 13, 1922. Serial No. 567,950.

*To all whom it may concern:*

Be it known that I, VICTOR HONORÉ GODILLON, a citizen of the Republic of France, residing at 125 Boulevard Davout, Paris, France, have invented new and useful Improvements in Deviators for Range Finders, which is fully set forth in the following specification.

The present invention relates to an improved deviator for range-finders.

Deviators for coincidence range-finders or for stereoscopic range-finders have heretofore been provided, comprising two plano-parallel glass plates mounted at a suitable angle relatively to the longitudinal optical axis of the apparatus, and adapted to receive simultaneously by means of a suitable actuating device, rotational motion around the said axis.

In the constructional form described and illustrated in the patent to Fouasse, No. 1,370,530, dated March 8, 1921, the two glass plates are mounted symmetrically in relation to the plane of the transverse axis of the apparatus.

Compared to the use of a single glass plate, the employment of two plano-parallel glass plates has the advantage of avoiding all vertical difference between the two images. Nevertheless when the two glass plates are arranged as in the constructional form described above, the two images certainly do remain on one and the same horizontal line, but this said horizontal line varies in altitude according to the distance of the object. The result is that the images of two objects situated at different distances and in the same alignment, instead of being seen on the same horizontal line, actually appear to be situated on horizontal lines of different altitudes or levels.

Under those conditions the range-finder cannot be used satisfactorily for measuring the site angles or in cases involving a site angle, for instance, in a combined telemeter and altimeter.

The present invention provides an improved deviator embodying the application of the same principle of using two plano-parallel glass plates, but allowing of correcting the unavoidable vertical displacements of the images according to the distance of the object.

The invention will best be understood by reference to the accompanying drawing wherein—

Fig. 1 diagrammatically illustrates one principle of the invention;

Figure 1:
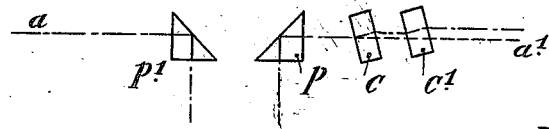

In the form shown two plano-parallel glass plates C C' are mounted in the manner illustrated in Figure 1 both on one and the same side, that is to say, for example, on the right hand of the erecting prism *p;* the two glass plates being positively connected together by their actuating mechanisms in such a manner as to rotate around the axis of the range-finder at equal speeds but in opposite directions. Thus they start from one position (the position indicated in the diagram) in which they are parallel to each other, that is, a position of zero deviation, and they can receive varying relative inclinations up to a maximum, according to the angle through which they have been rotated.

Figure 2:
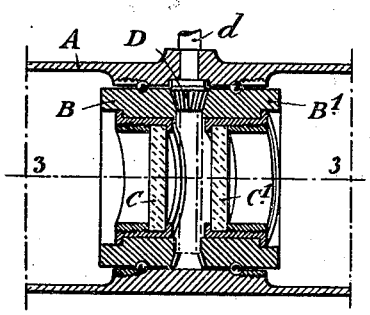
Fig. 2 is a vertical sectional detail of one embodiment of the present invention installed in the inner tube of a range finder.
Figure 3:
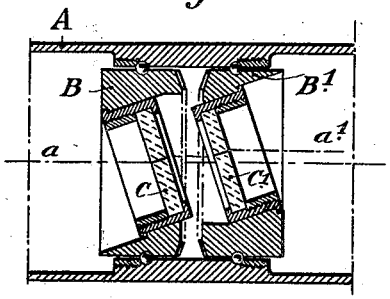
Fig. 3 is a section taken on line 3—3 of Fig. 2.
Figure 5:
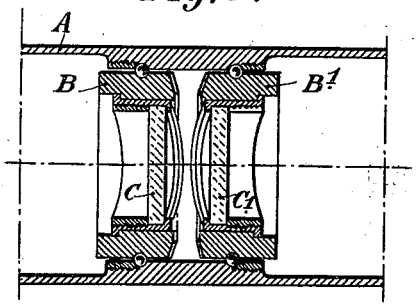
Fig. 5 is a section taken on line 5—5 of Fig. 4.

In Figures 2 and 3 the glass plates occupy the position of zero deviation, that is to say, the position they have as shown diagrammatically in Figure 1.

The sleeves or mounts B, B' are capable of rotating by means of ball bearings around the axis $a$—$a'$, and for this purpose, they are provided with teeth meshing with a common driving pinion D fixed on a shaft $d$ which is driven by any suitable gear $d^1$, $d^2$, $d^3$.

Figure 4:
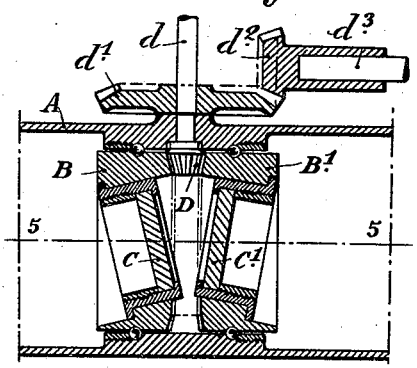
Fig. 4 is a view similar to Fig. 2, after the glass plates have been rotated through an angle of 90°.

Figure 4 shows the glass plates after each one has been rotated through 90°, thus brought into a position of intermediate deviation.

Figure 6:
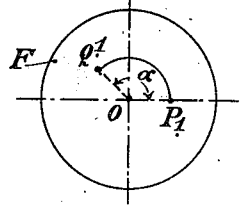
Figs. 6 and 7 are diagrammatic views illustrating the effects of employing a single glass plate.

In case an object were sighted through a range-finder having no deviator, the rays of light from said object entering the end windows of the range-finder would be directed, in a manner well known in the art, to the point O of eye-piece F. If a single plano-parallel glass plate C., placed in the position shown in Figs. 2 and 3, were used as a deviator, the image of the observed object would be seen in eye-piece F at P' (Fig. 6).

Figure 7:
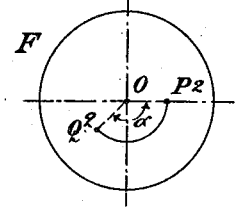

If a single plate C', positioned as shown in Figs. 2 and 3, were used as a deviator, an image of the object would be seen in the eye-piece at P² (Fig. 7).

If this single glass plate were rotated through an angle $\alpha$, the object instead of being seen at P', would be seen at Q', having described the arc of a circle P'—Q'.

The same object would be seen at P², having been deviated by the glass plate C' which then occupies the position shown in Figures 2 and 3. After this glass plate has been rotated through an angle $\alpha$ in the reverse direction of the rotation of the glass plate C, the object will be visible at Q², having described the arc of a circle P²—Q².

Figure 8:
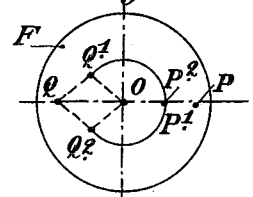
Fig. 8 is a diagrammatic showing of the results obtained by employing my improved deviator.

Owing to the employment of the two glass plates C and C' mounted in accordance with the present invention, the image of the same object is visible at P (Fig. 8) when the glass plates are occupying the positions shown in Figures 2 and 3.

When the two glass plates are rotated in opposite directions through the same angle $\alpha$, the resultant image of the images Q' and Q² is visible at Q on the horizontal line passing through P, Q'—Q being parallel to O—Q².

It will be perceived that whatever the distance of the object may be, the deviated image is formed always on the horizontal line passing through O. Therefore, not only are the images in the two eye-pieces, situated on one and the same horizontal line, but also this said horizontal line is always the centre horizontal line of the eye-pieces.

Having now particularly described and ascertained the nature of our said invention and in what manner the same is to be performed, we declare that what we claim is:—

1. A deviator for range-finders comprising a pair of plano-parallel glass plates revolvably mounted to intercept the rays of light proceeding from one of the end windows of a range-finder, and means for revolving said plates in opposite directions around the longitudinal axis of the range-finder.

2. A deviator for a range-finder comprising a pair of annular members having gear teeth formed on the contiguous faces thereof rotatably mounted in one end of said range-finder, a pair of plano-parallel glass plates mounted, one in each of said members, a pinion engaging the teeth of said members, and means for rotating said pinion.

3. A deviator for a range-finder comprising a pair of annular members mounted to rotate about the longitudinal axis of said range-finder in two parallel planes substantially at right angles to said axis, a pair of plano-parallel glass-plates mounted, one in each of said members, in planes inclined to said axis, and means for rotating said plates in opposite directions about said axis, said plates being positioned to intercept the rays of light proceeding from one of the end windows of said range-finder.

4. In a device of the class described, the combination of a plurality of plano-parallel glass plates mounted to rotate about the longitudinal axis of a range-finder and inclined to said axis, and means for simultaneously rotating the members in opposite directions, said members being positioned to intercept the rays of light proceeding from one of the end windows of said range-finder.

5. A deviator for range-finders comprising two plano-parallel glass plates movable around and inclined relative to the longitudinal axis of the range-finder and mounted on one and the same side of one of the erecting prisms of said range-finder, and means for moving said plates in opposite directions around said axis whereby the two images of the object on which the distance is to be obtained will always be formed on a horizontal line passing through the centers of the eye-pieces of said range-finder.

In testimony whereof I have signed this specification.

VICTOR HONORÉ GODILLON.